US011958334B2

(12) United States Patent
Chatham et al.

(10) Patent No.: US 11,958,334 B2
(45) Date of Patent: Apr. 16, 2024

(54) APPARATUS AND METHOD FOR LOW GRADE HEAT RECOVERY IN AN ELECTRIC VEHICLE

(71) Applicant: JAGUAR LAND ROVER LIMITED, Coventry (GB)

(72) Inventors: Chris Chatham, Coventry (GB); Dhillip Asokan, Coventry (GB); Kate Rouse, Coventry (GB); Oliver Stocks, Coventry (GB); Nilabza Dutta, Coventry (GB); Richard Cook, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 909 days.

(21) Appl. No.: 16/970,354

(22) PCT Filed: Jan. 21, 2019

(86) PCT No.: PCT/EP2019/051403
§ 371 (c)(1),
(2) Date: Aug. 15, 2020

(87) PCT Pub. No.: WO2019/158316
PCT Pub. Date: Aug. 22, 2019

(65) Prior Publication Data
US 2021/0086583 A1    Mar. 25, 2021

(30) Foreign Application Priority Data

Feb. 16, 2018    (GB) ...................................... 1802561

(51) Int. Cl.
*B60H 1/00*        (2006.01)
*B60H 1/03*        (2006.01)
(Continued)

(52) U.S. Cl.
CPC ..... *B60H 1/00392* (2013.01); *B60H 1/00278* (2013.01); *B60H 1/00428* (2013.01);
(Continued)

(58) Field of Classification Search
CPC ............ B60H 1/00278; B60H 1/00392; B60H 1/00428; B60H 1/00492; B60H 1/00921;
(Continued)

(56) References Cited

U.S. PATENT DOCUMENTS

2002/0100290 A1    8/2002    Herta et al.
2008/0011005 A1    1/2008    Obayashi et al.
(Continued)

FOREIGN PATENT DOCUMENTS

DE    102013021360 A1    6/2015
KR    20120042104 A     5/2012
(Continued)

OTHER PUBLICATIONS

Combined Search and Examination Report corresponding to GB Application No. GB1802561.9, dated Jul. 30, 2018, 7 pages.
(Continued)

*Primary Examiner* — Hung D Nguyen
(74) *Attorney, Agent, or Firm* — Reising Ethington P.C.

(57) ABSTRACT

A heat recovery system for an electric vehicle, including first and second switchable heat sources and a controller operable to selectively switch one of the heat sources into thermal communication with a compressor in a thermodynamic cycling system, the thermodynamic cycling system being in thermal communication with a heat sink; and a detector of a temperature differential between each of the switchable heat sources and a fluid entering the compressor; wherein the controller is operable to switch one of the first and second switchable heat sources into thermal communication with the thermodynamic cycling system when a temperature
(Continued)

differential is detected between the fluid entering the compressor in the thermodynamic cycling system and the heat available from the switchable heat source, the temperature differential being such that the compressor is operable to upgrade low grade heat from the switchable heat source to a higher grade heat upon operation of the compressor.

18 Claims, 8 Drawing Sheets

(51) Int. Cl.
  *B60H 1/14*  (2006.01)
  *B60H 1/32*  (2006.01)
  *B60L 58/27*  (2019.01)

(52) U.S. Cl.
  CPC ............... *B60H 1/03* (2013.01); *B60H 1/143* (2013.01); *B60H 1/3208* (2013.01); *B60H 1/3211* (2013.01); *B60H 1/3216* (2013.01); *B60L 58/27* (2019.02); *B60H 2001/00307* (2013.01)

(58) Field of Classification Search
  CPC .......... B60H 1/03; B60H 1/034; B60H 1/143; B60H 1/2221; B60H 1/3208; B60H 1/3211; B60H 1/3213; B60H 1/3216; B60H 1/3222; B60H 1/32281; B60H 1/32284; B60H 1/323; B60H 2201/00307; B60H 2201/00928; B60H 2201/00949; B60H 2201/3248; B60H 2201/325; B60H 2201/3252; B60H 2201/3257; B60H 2201/3258; B60H 2201/3263; B60H 2201/328; B60L 58/24; B60L 58/27; Y02T 10/70

See application file for complete search history.

(56) References Cited

U.S. PATENT DOCUMENTS

| | | | |
|---|---|---|---|
| 2009/0249802 | A1 | 10/2009 | Nemesh et al. |
| 2010/0156112 | A1* | 6/2010 | Held .................. F01K 7/165 |
| | | | 290/1 A |
| 2012/0174602 | A1 | 7/2012 | Olivier |
| 2015/0107278 | A1 | 4/2015 | Schmitz et al. |
| 2016/0332505 | A1 | 11/2016 | Yamanaka et al. |
| 2017/0021698 | A1* | 1/2017 | Hatakeyama ......... F25B 25/005 |
| 2018/0238223 | A1 | 8/2018 | Enomoto et al. |
| 2019/0366800 | A1* | 12/2019 | Durrani .............. B60H 1/00921 |

FOREIGN PATENT DOCUMENTS

| | | |
|---|---|---|
| WO | WO2015122137 A1 | 8/2015 |
| WO | WO2017056868 A1 | 4/2017 |

OTHER PUBLICATIONS

International Search Report corresponding to International Application No. PCT/EP2019/051403, dated May 23, 2019, 3 pages.
Written Opinion corresponding to International Application No. PCT/EP2019/051403, dated May 23, 2019, 7 pages.
Chinese Office Action corresponding to application 201980013509.0, dated Jul. 8, 2023, 21 pages.

* cited by examiner

Mode A, Mode B & Mode C State Flow:

APPARATUS AND METHOD FOR LOW GRADE HEAT RECOVERY IN AN ELECTRIC VEHICLE

TECHNICAL FIELD

The present disclosure relates to a heat recovery system and particularly, but not exclusively, to low grade heat recovery system for an electric vehicle. Aspects of the invention relate to a heat recovery system, to a vehicle, and to a method of recovering low grade heat energy, where a heat recovery system, a vehicle, and a method of recovering low grade heat energy are the subjects of each the independent claims.

BACKGROUND

Internal combustion engines mean that high grade heat energy is readily available from the burning of fuel to heat elements of the vehicle such as the passenger cabin and the battery.

However, in electric vehicles, high grade energy comes at a premium value and must be conserved and recovered wherever possible.

The invention applies to pure electric vehicles and improves cabin heating and battery heating in cold ambient conditions. It is usual to consume electrical power to provide direct electric heating however in electric vehicles direct electrical power is valuable to power the vehicle and the invention seeks to recover heat from both ambient air and powertrain components to deliver heat to the cabin and battery instead of using high value direct electrical energy.

It is an aim of the invention to provide a heat recovery system to improve the efficiency of heat recovery in an electrochemically powered vehicle.

It is an object of embodiments of the invention to at least mitigate one or more of the problems of the prior art.

SUMMARY OF THE INVENTION

Aspects and embodiments of the invention provide a heat recovery system, to a vehicle, and to a method of recovering low grade heat energy as claimed in the appended claims.

According to an aspect of the invention, there is provided a heat recovery system for an electric vehicle, comprising switchable heat sources and a control means operable to selectively switch at least one of the heat sources into thermal communication with a compressor in a thermodynamic cycling system, the thermodynamic cycling system being in thermal communication with a heat sink; and a detection means operable to detect a temperature differential between each of the switchable heat sources and a fluid entering the compressor; wherein the control means is operable (adapted, arranged) to switch the switchable heat sources into thermal communication with the thermodynamic cycling system when a temperature differential is detected between the fluid entering the compressor in the thermodynamic cycling system and the heat available from at least one of the switchable heat sources.

According to an aspect of the invention, there is provided a heat recovery system for an electric vehicle, comprising first and second switchable heat sources and a control means operable to selectively switch one of the heat sources into thermal communication with a compressor in a thermodynamic cycling system, the thermodynamic cycling system being in thermal communication with a heat sink; and a detection means operable to detect a temperature differential between each of the switchable heat sources and a fluid entering the compressor; wherein the control means is operable (adapted, arranged) to switch one of the first and second switchable heat sources into thermal communication with the thermodynamic cycling system when a temperature differential is detected between the fluid entering the compressor in the thermodynamic cycling system and the heat available from the switchable heat source.

In certain embodiment the temperature differential is such that the compressor is operable to upgrade low grade heat from the switchable heat source to a higher grade heat upon operation of the compressor.

In certain embodiments the first and second switchable heat sources are each in thermal communication with a fluid within the thermodynamic cycling system and the control means is operable (adapted, arranged) to actuate at least one control valve which is operable to selectively switch the fluid in thermal communication with one of the switchable heat sources into thermal communication with a compressor in the thermodynamic cycling system, wherein the controller is operable (adapted, arranged) to actuate the at least one control valve to switch one of the first and second switchable heat sources into thermal communication with the thermodynamic cycling system when a temperature differential is detected between a fluid entering a compressor in the thermodynamic cycling system and the heat available from the switchable heat source, the temperature differential being such that the compressor is operable to upgrade low grade heat from the switchable heat source to a higher grade heat upon operation of the compressor.

In certain embodiments the temperature differential is at least 5 Kelvin. That is to say, the temperature differential between the heat available from the first switchable heat source and the fluid entering the compressor and/or the temperature differential between the heat available from second switchable heat source and the fluid entering the compressor is at least 5 Kelvin. In this way, the temperature differential between the suction temperature at the inlet to the compressor and the heat available from the heat source is sufficient to enable an upgrade of low grade heat energy to high grade heat energy.

In certain embodiments the temperature is higher at the first or second switchable heat source than in the fluid entering the compressor. In some embodiments the temperature of the fluid entering the compressor is greater than or equal to −20 degrees Celsius. Below that temperature, the compressor may not operate.

In certain embodiments the detection means is configured (adapted, arranged) to monitor a temperature differential between the first switchable heat source and the fluid entering the compressor and between the second switchable heat source and the fluid entering the compressor in sequence. In this way, the heat source with the largest available low grade energy may be switched into thermal communication with the compressor.

In certain embodiments, thermal communication between the first and the second heat sources and the thermodynamic cycling system is by conductivity heat transfer.

In certain embodiments the detection means comprises one or more temperature sensors. More specifically, the detection means comprises at least one temperature sensor at the inlet to the compressor and operable to monitor the temperature of the fluid entering the compressor and a further temperature sensor at the outlet of each of the first and the second heat sources, each operable to monitor the temperature available from the heat source.

In certain embodiments, the detection means are operably linked to the control means to provide the temperatures at the inlet to the compressor and at each of the first and the second heat sources and the control means is operable to determine the temperature differential between the first heat source and the fluid entering the compressor and between the second heat source and the fluid entering the compressor.

In certain embodiments the control means is operably linked to the detection means and is operable to actuate the at least one control valve such that one of the heat sources is switched into thermal communication with the thermodynamic cycling system in response to the detection means detecting the temperature differential between at least one of: the first switchable heat source and the thermodynamic cycling system and the second switchable heat source and the thermodynamic cycling system.

In certain embodiments the control means comprises at least one controller, control unit, or control module.

In certain embodiments the control means comprises a programmable CPU (e.g. a Programmable Electronic control unit (ECU) or the like).

In certain embodiments the CPU is programmed with software to implement the methods of the invention.

In certain embodiments the thermodynamic cycling system comprises a heat pump.

In certain embodiments the thermodynamic cycling system comprises a first single phase fluid system comprising at least one heat exchanger, a multiphase fluid system in fluid communication with the at least one heat exchanger and comprising at least one compressor downstream of the heat exchanger and a second single phase fluid system downstream of the compressor and comprising at least one heat exchanger, the first single phase, the multiphase fluid and the second single phase fluid systems being consecutively in thermal communication with one another.

In certain embodiments the thermodynamic cycling system comprises a coolant system comprising at least one heat exchanger, a refrigerant system in fluid communication with the at least one heat exchanger and comprising at least one compressor downstream of the heat exchanger and a second coolant system downstream of the compressor and comprising at least one heat exchanger, the coolant and refrigerant systems being consecutively in thermal communication with one another.

More specifically, the thermodynamic cycling system comprises a coolant circuit fluidly connected to a heat exchanger functioning as an evaporator, the heat exchanger is further fluidly connected to a compressor in a refrigerant system comprising a refrigerant circuit which circuit comprises a heat exchanger functioning as a condenser. The condenser in the refrigerant circuit is in thermal communication with a second coolant circuit which in turn comprises a heat exchanger in thermal communication with a heat sink.

In certain embodiments the thermodynamic cycling system comprises a ambient air capture unit system comprising at least one heat exchanger, a refrigerant system in fluid communication with the at least one heat exchanger and comprising at least one compressor downstream of the heat exchanger and a coolant system downstream of the compressor and comprising at least one heat exchanger, the coolant and refrigerant systems being consecutively in thermal communication with one another.

In certain embodiments the ambient air capture unit system comprises at least one heat exchanger being a condenser.

In certain embodiments the ambient air capture unit system comprises at least one heat exchanger being an evaporator or a dehumidifier.

In certain embodiments wherein the second single phase fluid system comprises at least one heat exchanger in thermal communication with the heat sink.

In certain embodiments wherein the coolant system downstream of the compressor comprises at least one heat exchanger in thermal communication with the heat sink.

In certain embodiments the second single phase fluid system comprises at least one valve controllable to switch single phase fluid flow to a heat exchanger in thermal communication with a second heat sink. More specifically, at least one three way valve is controllable to switch single phase fluid flow to a heat exchanger in thermal communication with a second heat sink.

In certain embodiments the coolant system downstream of the compressor comprises at least one valve controllable to switch coolant flow to a heat exchanger in thermal communication with a second heat sink. More specifically, at least one three way valve is controllable to switch single phase fluid flow to a heat exchanger in thermal communication with a second heat sink.

In certain embodiments the second heat sink is a traction battery.

In certain embodiments the heat exchanger in thermal communication with the second heat sink is in further thermal communication with the first heat sink. More specifically, the heat exchanger in fluid communication with the first and the second heat sinks is a condenser.

In certain embodiments the switchable heat sources are low grade energy sources.

In certain embodiments the thermodynamic cycling system is operable (adapted, arranged) to convert the lower grade energy from the switchable heat sources to a higher grade of energy.

In certain embodiments the low grade energy source is one or more of: a power transmission unit, an HVAC evaporator or ambient air.

In certain embodiments the heat sink is one of a passenger cabin and a traction battery.

In certain embodiments the low grade energy source(s) is in thermal communication with the thermodynamic cycling system via a coolant circuit.

In certain embodiments the low grade energy source is in thermal communication with the thermodynamic cycling system via a control valve operable to select the low grade energy source which is fluidly connected to the thermodynamic cycling system.

In certain embodiments the at least one control valve is a three way valve.

In certain embodiments the at least one control valve comprises an expansion valve, a three way valve and a shut off valve.

According to a further aspect of the invention there is provided a vehicle comprising and engine and a heat recovery system according to the present invention, wherein the heat sink is one or more of the passenger cabin and the traction battery.

In certain embodiments the engine is electrochemically powered.

According to another aspect of the invention, there is provided a method of recovering low grade heat energy in an electric vehicle, comprising providing first and second switchable low grade heat sources;

providing a thermodynamic cycling system comprising first and second fluids in thermal communication with each of the first and second switchable low grade heat sources respectively;

detecting a temperature differential between a fluid entering the compressor in the thermodynamic cycling system and the heat available from the first and the second switchable heat source, switching the first or second fluid in thermal communication with one of the switchable heat sources into thermal communication with a compressor in the thermodynamic cycling system when the temperature differential is such that the compressor is operable to upgrade low grade heat from the switchable heat source to a higher grade heat upon operation of the compressor;

transferring the higher grade heat to a heat sink.

In certain embodiments the temperature differential is at least 5 Kelvin. In this way, useful low grade heat energy can be extracted from the heat source and upgraded by the system.

In certain embodiments the temperature is higher at the first or second switchable heat source than in the fluid entering the compressor.

In certain embodiments, heat recovered from the ambient air capture unit system via the thermally coupled refrigerant circuit and the powertrain via the thermal coupled coolant circuit is used to heat the first heat sink (e.g. passenger cabin) first, then when first heat sink (e.g. passenger cabin) reaches the correct temperature comfort level a second heat sink (e.g. traction battery heater) proportional valve is open to split the heating available between the first heat sink (e.g. passenger cabin) and partially to heat the second heat sink (e.g. traction battery).

In certain embodiments there are at least two switchable three-way valves under the control of the control means and operable to switch heat capture from the first to the second switchable heat source and further to allow distribution of heat flow from the low grade first and second heat sources (e.g. powertrain and external ambient air) to the first and second heat sinks (e.g. passenger cabin and traction battery) via a selected combination of: a heat pump loop comprising a heat pump condenser or an evaporator fluidly coupled to a compressor and 3 fluid transfer circuits (first and second coolant circuits and a refrigerant circuit). More specifically, the selected combination can be: a first coolant transfer circuit, a refrigerant fluid transfer circuit and a second coolant fluid transfer circuit; a heat loop circuit comprising a heat pump condenser fluidly coupled to a compressor and a refrigerant fluid transfer circuit and a second coolant fluid transfer circuit; a heat loop circuit comprising an evaporator fluidly coupled to a compressor and a refrigerant fluid transfer circuit and a second coolant fluid transfer circuit; or a first coolant transfer circuit, a refrigerant fluid transfer circuit and a second coolant fluid transfer circuit in thermal communication with both the first and second heat sinks.

In certain embodiments the heat pump loop comprises a second low grade energy heat source (e.g. ambient air capture unit system) thermally coupled to a heat pump condenser or an evaporator fluidly coupled to a compressor and to the refrigerant fluid transfer circuit.

In certain embodiments, the heat pump loop comprises a second low grade energy heat source (e.g. ambient air capture unit system) thermally coupled to a heat pump condenser associated with at least one shut off valve and an expansion valve, the heat pump condenser being fluidly coupled by a refrigerant circuit to a heat pump (e.g. compressor) when the expansion valve at the at least one shut off valve are open.

In certain embodiments, the heat pump loop comprises a second low grade energy heat source (e.g. ambient air capture unit system) thermally coupled to an evaporator associated with at least one shut off valve, the evaporator being fluidly coupled by a refrigerant circuit to a heat pump (e.g. compressor) when the at least one shut off valve is open.

In certain embodiments, the first transfer fluid circuit containing low grade heat comprises a coolant circuit in thermal communication with a first low grade heat source (e.g. a powertrain, battery), a pump associated with the first low grade heat source and operable to move coolant fluid around the circuit, a switchable three way valve operable in a first position to reject low grade energy to a further heat exchanger in the first fluid circuit upstream of the low grade heat source and in a second position to fluidly connect the coolant circuit to a heat exchanger (e.g. an evaporator or dehumidifier) and the second fluid circuit.

In certain embodiments, the second transfer fluid circuit in which low grade heat is converted to high grade heat comprises the refrigerant side of the heat exchanger (e.g. an evaporator or a dehumidifier) of the first fluid circuit, a heat pump (e.g. a compressor) and a heat exchanger downstream of the compressor and thermally coupled to the third fluid circuit.

In certain embodiments the third fluid transfer circuit comprises the coolant side of the heat exchanger of the second fluid circuit being downstream of the compressor a pump operable to move coolant fluid around the circuit, a heat exchanger in thermal communication with a first high grade heat sink (e.g. passenger cabin) and a switchable three way valve downstream of the a heat exchanger in thermal communication with a first high grade heat sink operable in a first position to return coolant fluid to the coolant side of the heat exchanger of the second fluid circuit and in a second position to direct coolant flow to a further heat exchanger (e.g. condenser) wherein coolant is split between a return coolant fluid to the coolant side of the heat exchanger of the second fluid circuit and coolant circuit comprising a second heat sink (e.g. a traction battery).

In this way, when the switchable three way valve of the first fluid circuit is in the second position, low grade heat is transferred from the first fluid circuit to the second fluid circuit via the heat exchanger (e.g. evaporator, dehumidifier) and then from the second fluid circuit to the third fluid circuit via the heat exchanger downstream of the compressor (e.g. condenser), the second fluid circuit pump (e.g. compressor) transferring high grade heat via the third fluid circuit and the heat exchanger in thermal communication with the first heat sink (e.g. condenser) to the first high grade heat sink (e.g. passenger cabin) and, when the switchable three way valve of the third fluid circuit is in the second position to the second high grade heat sink (e.g. traction battery).

In certain embodiments, the circuits and heat pump loop each comprise connection lines (e.g. conduits, pipes) to fluidly connect the components of the circuits.

In certain embodiments the heat recovery system of the present invention has various modes of operation in which low grade heat energy is transferred from one of the low grade energy heat sources to at least one heat sink.

In certain embodiments, the various modes of operation transfer heat from: the powertrain to the passenger cabin, from the ambient air capture unit system to the passenger cabin, from the ambient air capture unit system to the passenger cabin with dehumidification or from the powertrain to the traction battery (and the passenger cabin).

In certain embodiments it is envisaged that there may be operational changes between the various modes dependent upon use of the vehicle and the ambient temp (e.g. warm up).

In certain embodiments low grade heat energy recovery from the electric vehicle powertrain and the external ambient air (second heat source) is switchably scheduled according to a control algorithm by the control means operably linked to the components of the system and in order of the thermodynamic entropic state of the switchable heat sources. The control means is operable to initiate one or more operating modes, Mode A, Mode B, Mode C, Mode D in the system of the invention.

Mode A

Low grade heat energy from the electric vehicle powertrain is transferred to a first fluid transfer circuit comprising a single phase fluid (e.g. coolant). This fluid (e.g. coolant) is directed via a three way valve to a heat exchanger (e.g. evaporator, dehumidifier). Low grade heat is exchanged from the single phase fluid (e.g. coolant) to a multi-phase fluid (e.g. refrigerant) of a second fluid transfer circuit within the heat exchanger (e.g. evaporator, dehumidifier). The grade of heat is then upgraded from low to high via a vapour compression thermodynamic cycle using a heat pump comprising a compressor which requires input electrical energy. The high grade heat output from the heat pump (e.g. compressor) is then transported via a shut off valve in the second fluid circuit comprising refrigerant fluid into a heat exchanger (e.g. indirect condenser). This high grade heat is then transferred to a third fluid transfer circuit in which a single phase fluid (e.g. coolant) within the heat exchanger (e.g. indirect condenser). This high grade heat is then transported by the single phase fluid circuit (e.g. coolant) using a pump to a further heat exchanger where it is transferred to the first high grade heat sink (e.g. passenger cabin).

Mode B Low grade heat energy from ambient air is captured in an ambient air capture unit. The low grade heat is recovered into a heat loop circuit comprising a multiphase fluid (e.g. refrigerant) and a heat exchanger (e.g. heat pump condenser). The low grade heat is transported in the heat loop circuit via a shut off valve to a vapour compression thermodynamic cycle using a heat pump comprising a compressor which requires input electrical energy wherein the low grade heat energy is upgraded to high grade energy. This high grade heat is then transported in a second fluid transfer circuit via a further shut off valve into a heat exchanger (e.g. indirect condenser). This high grade heat is then transferred to a third fluid transfer circuit in which a single phase fluid (e.g. coolant) within the heat exchanger (e.g. indirect condenser). This high grade heat is then transported by the single phase fluid circuit (e.g. coolant) using a pump to a further heat exchanger where it is transferred to the first high grade heat sink (e.g. passenger cabin).

Mode C Low grade heat energy from ambient air is recovered using an ambient air capture unit. The low grade heat is recovered into a heat loop circuit comprising a multiphase fluid (e.g. refrigerant) and a heat exchanger (e.g. an evaporator, a dehumidifier). The low grade heat is transported in the heat loop circuit via a cut off valve to a vapour compression thermodynamic cycle using a heat pump comprising a compressor which requires input electrical energy wherein the low grade heat energy is upgraded to high grade energy.

This high grade heat is then transferred to a third fluid transfer circuit in which a single phase fluid (e.g. coolant) within the heat exchanger (e.g. indirect condenser). This high grade heat is then transported by the single phase fluid circuit (e.g. coolant) using a pump to a further heat exchanger where it is transferred to the first high grade heat sink (e.g. passenger cabin).

Mode D

Low grade heat energy from the electric vehicle powertrain is transferred to a first fluid transfer circuit comprising a single phase fluid (e.g. coolant). This fluid (e.g. coolant) is directed via a three way valve to a heat exchanger (e.g. evaporator, dehumidifier). Low grade heat is exchanged from the single phase fluid (e.g. coolant) to a multi-phase fluid (e.g. refrigerant) of a second fluid transfer circuit within the heat exchanger (e.g. evaporator, dehumidifier). The grade of heat is then upgraded from low to high via a vapour compression thermodynamic cycle using a heat pump comprising a compressor which requires input electrical energy. The high grade heat output from the heat pump (e.g. compressor) is then transported via a shut off valve in the second fluid circuit comprising refrigerant fluid into a heat exchanger (e.g. indirect condenser). This high grade heat is then transferred to a third fluid transfer circuit comprising a single phase fluid (e.g. coolant) within the heat exchanger (e.g. indirect condenser). This high grade heat is then transported by the single phase fluid (e.g. coolant) in the third fluid transfer circuit using a pump to a further heat exchanger. This high grade heat is then transported by the third single phase fluid transfer circuit (e.g. coolant) using a pump and via a three way valve to a yet further heat exchanger in fluid communication with the further heat exchanger. The heat is then transferred to another single phase fluid (e.g. coolant) within the yet further heat exchanger and is transported via a further three way valve associate with a heat exchanger to the second high grade heat sink (e.g. traction battery).

In certain embodiments, the scheduling of heat transfer from different switchable low grade energy sources is done via a control algorithm which is shown in FIGS. 6 and 7 respectively.

When referred to herein "Low grade heat" is energy/heat at low temperature and "high grade heat" is energy/heat at high temperature.

When referred to herein a "thermodynamic cycler" comprises one or more of: a heat pump condenser, heat exchanger, a condenser, an evaporator and a dehumidifier. As referred to herein a "thermodynamic cycling system" comprises one in which a series of thermodynamic processes in a series of thermodynamic cyders returns a system to its initial thermodynamic state.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
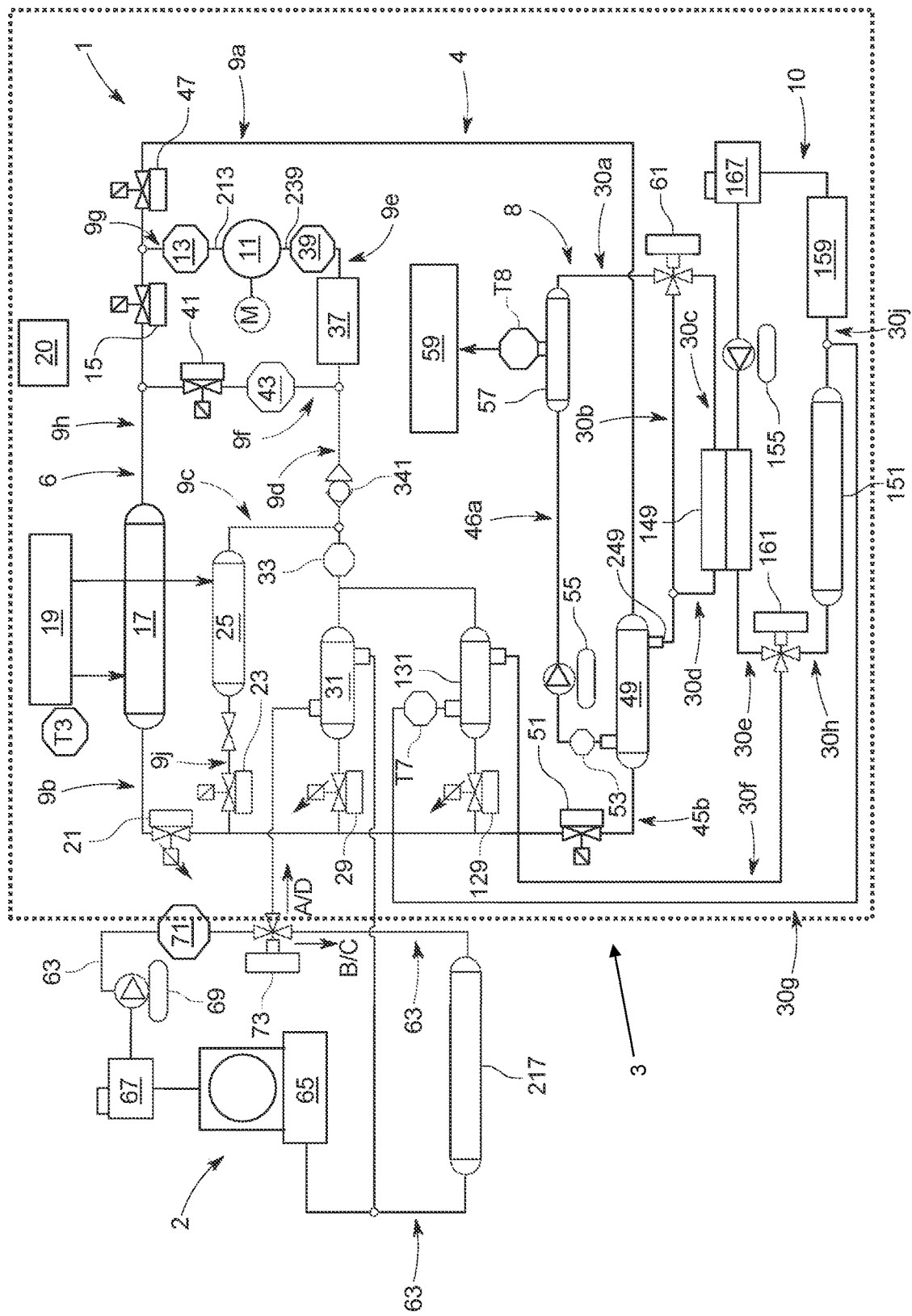
FIG. 1 shows an electric vehicle heat recovery system according to an embodiment of the invention.

Wherever possible, like reference numerals are used to depict similar features throughout.

As shown in FIG. 1, the heat recovery system 1 for an electric vehicle (see 203 in FIG. 8) comprises a thermodynamic cycling system 3 having a heat pump circuit 6 thermally coupled to three fluid transfer systems 2, 4, 8/10. The components are indicated in the flow path of a fluid during operation within the respective circuits. When used herein "upstream" and "downstream" relate to the direction in which fluid will flow in the circuit.

In FIG. 1, coolant circuit 2 comprises a low grade energy source, an electric vehicle powertrain 65, fluidly connected through expansion header tank 67 and pump 69 to a three way switchable valve 73. A temperature sensor 71 monitors the temperature of the powertrain 65 and, therefore, the low grade energy available from powertrain 65. A heat exchanger 217 fluidly connected to the powertrain 65 completes the coolant circuit. In operation, when the three way valve 73 directs the coolant in the circuit 2 in the direction "B/C" to the heat exchanger 217, the low grade energy is rejected from the rest of the heat recovery system 1. When three way valve 73 directs the coolant in the direction "A/D" in the circuit 2, the coolant circuit is in thermal communication with a refrigerant circuit 4 and/or a heat pump circuit 6. The components of the coolant circuit 2 are fluidly connected by fluid pipes 63.

The coolant circuit 2 containing low grade heat is in thermal communication with a first low grade heat source in the powertrain 65 of the electric vehicle. The pump 63 associated with the powertrain 65 is operable to move coolant fluid around the circuit 2 and the switchable three way valve 73 is operable in a first position to reject low grade energy to the heat exchanger 217 positioned in the coolant circuit 2 upstream of the powertrain 65 and in a second position of valve 73 is operable to fluidly connect the coolant circuit 2 to an evaporator or dehumidifier 31 and a second fluid circuit, being the refrigerant circuit 4.

The refrigerant fluid circuit 4, which is operable to convert the low grade heat entering the heat recovery system 1 to high grade heat, comprises the refrigerant side of the evaporator 31 of the coolant circuit 2, a compressor 11 having its own electrical input "M" and a condenser 49 downstream of the compressor 11 which is thermally coupled to a third fluid circuit, being coolant circuit 8/10. Shut off valve 47 is in the refrigerant line 9a between the compressor 11 and the condenser 49 and is operable to control refrigerant flow in the refrigerant circuit 4. Temperature and pressure sensor 39 monitors the temperature and the pressure of refrigerant fluid entering the compressor 11. Sensor 13 measures the temperature and pressure of refrigerant exiting the compressor 11 to valve 47 and refrigerant line 9a. The refrigerant circuit 4 continues from condenser 49 through shut off valve 51 to one or more of: evaporator 31 (through associated expansion valve 29), evaporator 131 (through associated expansion valve 129). The refrigerant side of condenser 49 is further fluidly coupled to a heat loop circuit 6. The heat loop circuit 6 is thermally coupled to a second low grade energy source, being the ambient air 19 outside the vehicle (not shown). Heat pump condenser 17 is thermally coupled to the ambient air through an ambient air capture unit 19. The heat pump condenser 17 is fluidly coupled to the compressor 11 of the refrigerant circuit 4 through refrigerant lines (9b, 9c, 9d, 9e, 9f or 9g, 9h). Refrigerant flow is controlled under the direction of controller 20 operating associated valves: expansion valve 21, shut off valve 23, shut off valve 41 and shut off valve 15.

The heat loop circuit 6 also comprises an evaporator/dehumidifier 25 thermally coupled to a second low grade energy source, being the ambient air 19 outside the vehicle (not shown).

Evaporator/Dehumidifier 25 is thermally coupled to the ambient air through an ambient air capture unit 19. The evaporator/dehumidifier 25 is fluidly coupled to the compressor 11 of the refrigerant circuit 4 through refrigerant lines (9c, 9d, 9e) and to the refrigerant circuit 4 from condenser 49 via associated shut off valves 51 and 23 and refrigerant line 9j. Refrigerant flow is controlled under the direction of controller 20 operating associated valves.

System 1 further comprises a third fluid transfer circuit being a coolant circuit 8/10 comprising the coolant side of the condenser 49 of the refrigerant circuit 4 which is downstream of the compressor 11, a pump 55 operable to move coolant fluid around the circuit 8 and a heat exchanger 57 in thermal communication with a first high grade heat sink being passenger cabin 59. The temperature of coolant in the circuit 8 is measured by temperature sensor 53. Coolant line 30a fluidly connects the heat exchanger 57 with a three way valve 61 which, in coolant circuit 8, fluidly connects the heat exchanger 57 with the return coolant inlet 249 of condenser 49. In coolant circuit 10, the three way valve 61 is switched under the control of controller 20 to a second position in which heat exchanger 57 is in fluid connection through line 30a and line 30c with heat exchanger 149. The heat exchanger 149 is, in turn, fluidly connected through line 30d to inlet 249 of condenser 49 and through line 30e to a further three way valve 161. Three way valve 161 is operable to in a first position to fluidly connect heat exchanger 149 through line 30f to the coolant side of heat exchanger 131 (the refrigerant side of which heat exchanger can form part of refrigerant circuit 4 via associated expansion valve 129) and through lines 30g and 30j to second high grade heat sink, being traction battery 159. In its second position, valve 161 is operable to fluidly connect heat exchanger 149 to heat exchanger 151 via lines 30e and 30h, the heat exchanger 151 being fluidly connected to the second heat sink being traction battery 159 through line 30j. Three way valve 61 is operable to be switchable under the direction of controller 20 to fluidly connect the coolant circuit 8 with the passenger cabin and to fluidly connect the coolant circuit 8 and 10 with the traction battery as required.

In certain embodiments, the coolant 2, 8, 10 and refrigerant circuit 4 and the heat pump circuit 6 each comprise connection lines (e.g. conduits, pipes) to fluidly connect the components of the circuits.

The controller 20 is operable to switch one or more of the valves in the circuits 2, 4, 6, 8 and 10 to thermally connect one of the low grade heat sources, being powertrain 65 or ambient air within ambient air capture unit 19 with the compressor 11 and circuits 2, 4, 6, 8, 10 of the thermocycling system 1.

The controller 20, which can be a controller, a control unit or a module such as a programmable CPU, is operable to switch the heat recovery system between any one of a number of modes. In the depicted embodiments, four modes are shown. The controller 20 may be the vehicle central management system processor.

The controller 20 is operably connected to the system 1 and the components thereof. For the sake of clarity, the connections between the controller 20 and the components of the system 1 are not shown.

Low grade heat energy recovery from the electric vehicle powertrain 65 and the external ambient air (second heat source) 19 is switchably scheduled by the controller 20 operably linked to the components of the system 1 and in order of the thermodynamic entropic state of the switchable heat sources 65, 19.

Figure 2:
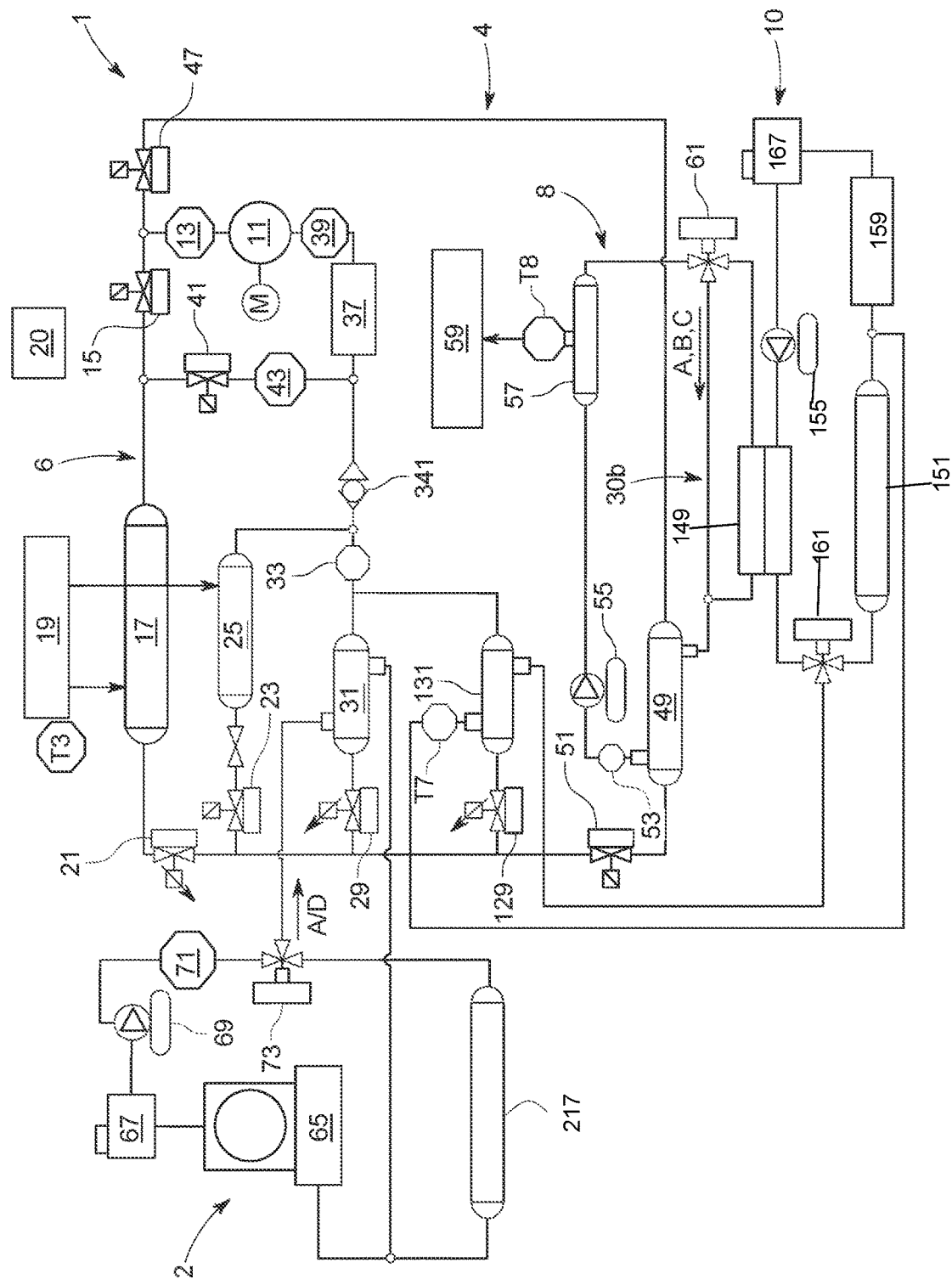
FIG. 2 shows the electric vehicle heat recovery system of FIG. 1 according to a first (A) mode of operation.

FIG. 2 depicts a mode A in which low grade heat energy from the electric vehicle powertrain 65 is transferred to the coolant circuit 2. Three way valve 73, under the direction of controller 20, directs coolant to the evaporator, dehumidifier 31 in the direction "A/D". Low grade heat is exchanged from the coolant to a multi-phase refrigerant in the refrigerant system 4 within the evaporator/dehumidifier 31. The refrigerant from evaporator/dehumidifier 31 passes temperature and pressure sensor 33 and cut off valve 341 to accumulator 37.

The grade of heat in the refrigerant is then upgraded from low to high via a vapour compression thermodynamic cycle using compressor 11 which requires input electrical energy "M". The high grade heat output from the compressor 11 is then transported via a shut off valve 47 in the refrigerant circuit 4 comprising refrigerant fluid into indirect condenser 49. This high grade heat is then transferred to coolant circuit 8 within the indirect condenser 49. This high grade heat is then transported by the coolant using pump 55 to a further heat exchanger 57 where it is transferred to the first high grade heat sink (e.g. passenger cabin 59).

In operating Mode A, the heat pump circuit 6 comprising heat pump condenser 17 and evaporator/dehumidifier 25 which are thermally coupled to heat source 19 (ambient air) is isolated from the refrigerant circuit 4 by the controller 20 closing expansion valve 21, shut off valves 23, 41 and 15. The coolant circuit 2 is coupled to the refrigerant circuit 4 by operation of valve 73 to fluidly couple the coolant in circuit 2 with evaporator 31. In addition, the controller 20 switches three way valve 61 to fluidly couple heat exchanger 57 with indirect condenser 49 through refrigerant line 30b.

Figure 3:
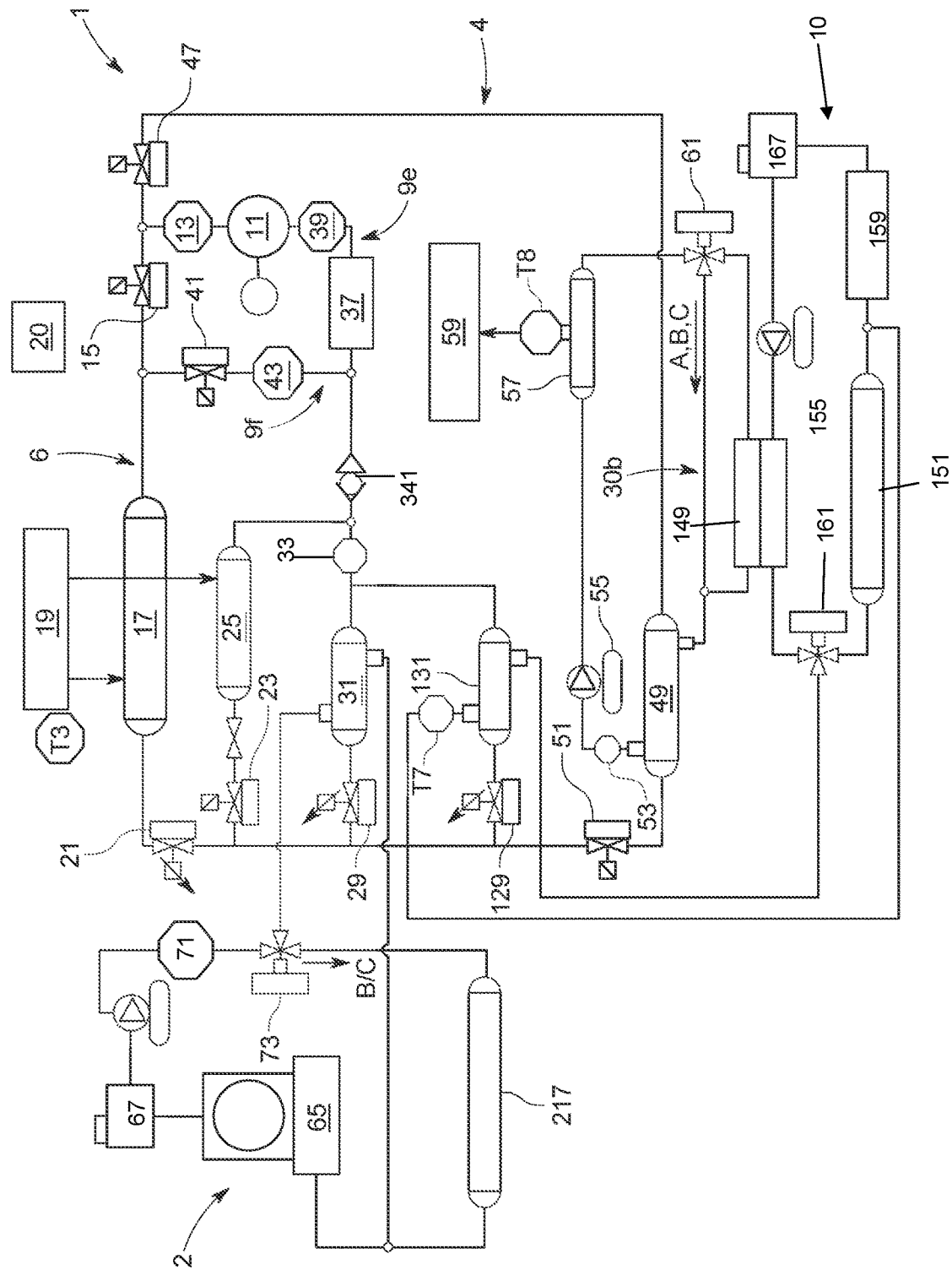
FIG. 3 shows the electric vehicle heat recovery system of FIG. 1 according to a second (B) mode of operation.

FIG. 3 shows the heat recovery system 1 in operating Mode B. In Mode B, low grade heat energy from ambient air is captured in an ambient air capture unit 19. The low grade heat is recovered into a heat loop circuit 6 comprising a refrigerant and a heat pump condenser 17. The low grade heat is transported in the heat loop circuit 6 via a shut off valve 41 to a vapour compression thermodynamic cycle using a compressor 11 which requires input electrical energy "M" wherein the low grade heat energy is upgraded to high grade energy. This high grade heat is then transported in refrigerant circuit 4 via a further shut off valve 47 into indirect condenser 49. This high grade heat is then transferred to coolant circuit 8 in a coolant within the indirect condenser 49. This high grade heat is then transported by the coolant using a pump 55 to a further heat exchanger 57 where it is transferred to the first high grade heat sink (e.g. passenger cabin 59). Temperature and pressure sensor 53 monitors the temperature and pressure of the coolant in circuit 8. Three way valve 61, under the direction of the controller 20, directs coolant from heat exchanger 57 to heat exchanger 49 in direction "A, B, C" through line 30b.

In operating Mode B, the heat pump circuit 6 comprising evaporator/dehumidifier 25 which are thermally coupled to heat source 19 (ambient air) is isolated from the refrigerant circuit 4 by the controller 20 closing shut off valve 23. Refrigerant returns to heat pump condenser through valve 51 and expansion valve 21 both of which are opened by the controller 20. Shut off valve 15 is closed preventing refrigerant return to the heat pump condenser therethrough and evaporators 31 and 131 are isolated from the refrigerant circuit by closing associated valves 29 and 129 respectively. The coolant circuit 2 is isolated from the refrigerant circuit 4 by operation of valve 73 to fluidly couple the powertrain 65 with heat exchanger 217 in coolant in circuit 2. In addition, the controller 20 switches three way valve 61 to fluidly couple heat exchanger 57 with indirect condenser 49 through refrigerant line 30b.

Operating Modes A and B can be operated concurrently when controller 20 opens both expansion valve 29 associated with the refrigerant side of evaporator 31 and expansion valve 21 associated with heat pump condenser 17. In addition, in the combined A/B Mode of operation, three way valve 73 fluidly connects the coolant circuit 2 with the coolant side of evaporator 31.

Figure 4:
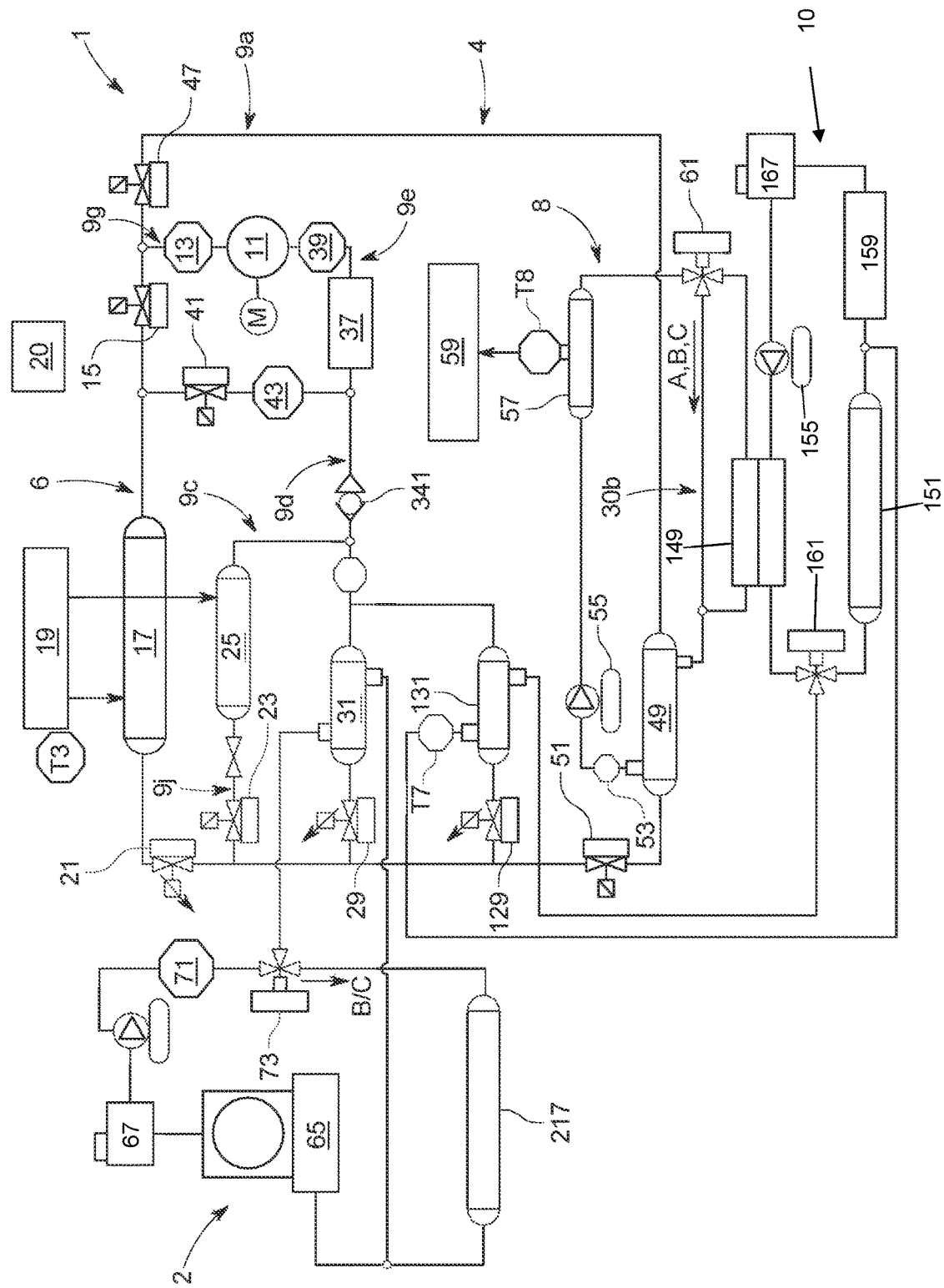
FIG. 4 shows the electric vehicle heat recovery system of FIG. 1 according to a third (C) mode of operation.

FIG. 4 shows the heat recovery system 1 in operating Mode C. In Mode C, low grade heat energy from ambient air is recovered using an ambient air capture unit 19. The low grade heat is recovered into a heat loop circuit 6 comprising refrigerant and an evaporator/dehumidifier. The low grade heat is transported in the heat loop circuit 6 via a cut off valve 341 to a vapour compression thermodynamic cycle using a compressor 11 as a heat pump. The compressor 11 requires input electrical energy from a source "M". The low grade heat energy is upgraded to high grade energy by the compressor 11.

This high grade heat is then transported in refrigerant circuit 4 via a further shut off valve 47 into indirect condenser 49. This high grade heat is then transferred to coolant circuit 8 through line 9a within the indirect condenser 49. This high grade heat is then transported by the coolant using a pump 55 to a further heat exchanger 57 where it is transferred to the first high grade heat sink (e.g. passenger cabin 59). Temperature and pressure sensor 53 monitors the temperature and pressure of the coolant in circuit 8. Three way valve 61, under the direction of the controller 20, directs coolant from heat exchanger 57 to heat exchanger 49 in direction "A, B, C" through line 30b.

The controller 20 can switch between Mode B and C by opening valve 23 whilst also closing expansion valve 21 and shut off valve 41 in heat pump circuit 6.

Evaporators 31 and 131 are isolated from the refrigerant circuit 4 by closing associated valves 29 and 129 respectively. In addition, in the depicted embodiment, the coolant circuit 2 is isolated from the refrigerant circuit 4 by operation of valve 73 to fluidly couple the powertrain 65 with heat exchanger 217 in coolant in circuit 2.

Evaporator/Dehumidifier 25 is operable to remove the moisture from the air and therefore also the latent heat in the moisture. The process of dehumidification of the ambient air within evaporator/dehumidifier 25 raises the coolant temperature in line 9c and provides a pre-compressor increase in the grade of heat entering the compressor 11 from energy source 19.

Operating Modes A and C can be operated concurrently when controller 20 opens both expansion valve 29 associated with the refrigerant side of evaporator 31 and shut off valve 23 associated with evaporator, dehumidifier 25. In addition, in the combined A, C Mode of operation, three way valve 73 fluidly connects the coolant circuit 2 with the coolant side of evaporator 31.

It is possible to operate Modes B and C together by operating valves 21 and 41.

Figure 5:
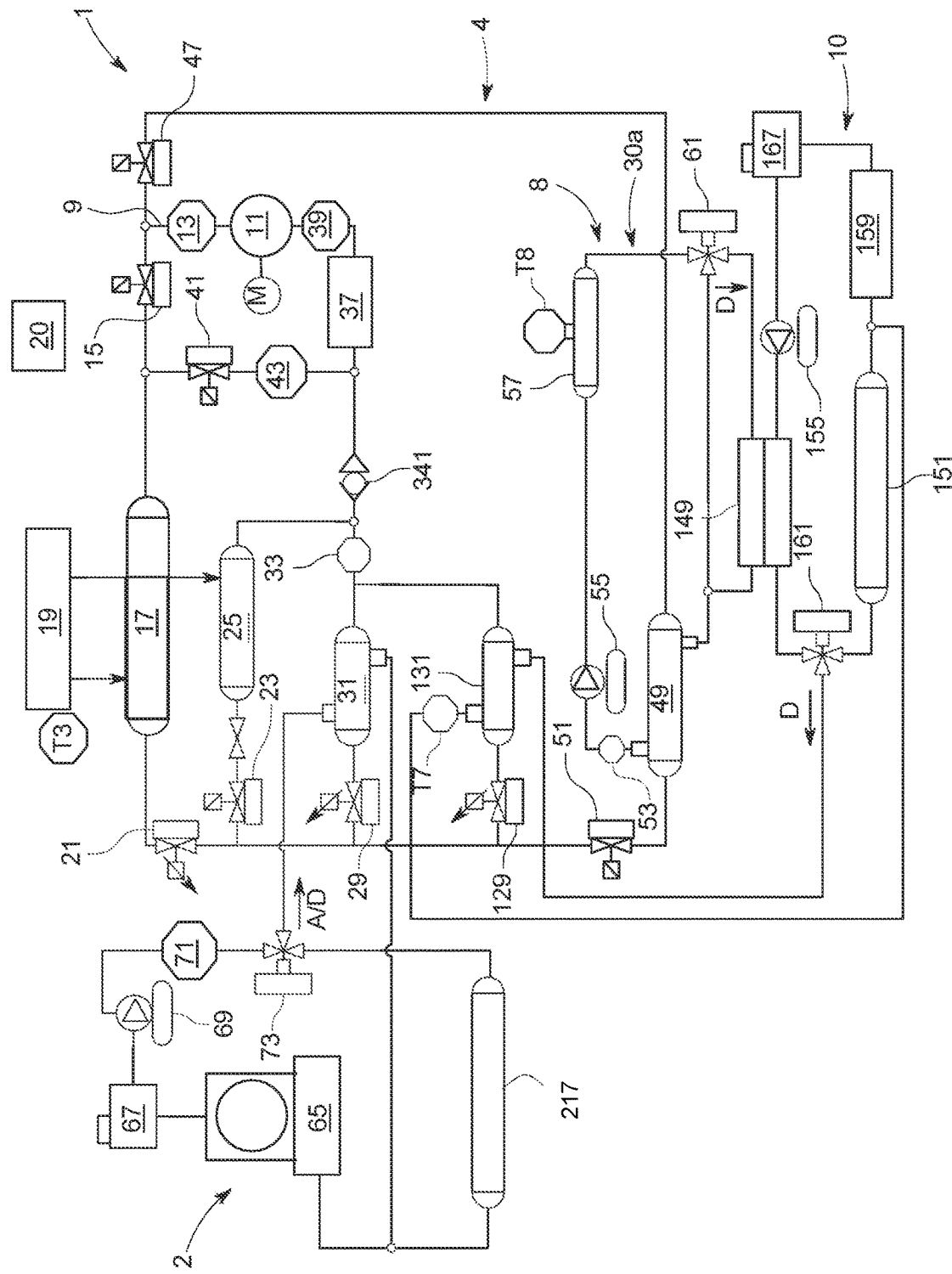
FIG. 5 the electric vehicle heat flux management system of FIG. 1 according to a fourth (D) mode of operation.

FIG. 5 shows the heat recovery system 1 in operating Mode D. In Mode D, as in Mode A and FIG. 2, low grade heat energy from the electric vehicle powertrain 65 is transferred to a coolant in coolant circuit 2. The coolant passes from powertrain 65, through expansion header tank 67 and pump 69 to temperature sensor 71. At three way valve 73, the coolant fluid is directed to evaporator 31. Low grade heat is exchanged from the coolant to a refrigerant in a refrigerant circuit 4 within the evaporator 31. The grade of heat is then upgraded from low to high via a vapour compression thermodynamic cycle using a compressor 11, which requires input electrical energy from source "M". The high grade heat output from the compressor 11 is then transported via a shut off valve 47 into indirect condenser 49. This high grade heat is then transferred to a coolant circuit 8 comprising coolant within the indirect condenser 49. This high grade heat is then transported by the coolant in circuit 8 using a pump 55 into further heat exchanger 57. This high grade heat is then transported by the coolant through line 30a to a three way valve 61 wherein it is directed to a yet further heat exchanger 149 in fluid communication with the further heat exchanger 57. The heat is then transferred to coolant within a coolant system 10 comprising heat exchanger 149 and is transported via a further three way valve 161 associated with an evaporator 131 to the second high grade heat sink (e.g. traction battery 159). In its alternative position, the three way valve 161 directs coolant to heat exchanger 151 and on to the traction battery 159 and expansion header tank 167.

In Mode D, the controller 20 has switched the heat sink from the passenger cabin 59 to the traction battery 159. Coolant circuit 8 through heat exchanger 49 is the passenger cabin 59 heater circuit and the coolant circuit 10 through heat exchanger 149 is the battery heater circuit. Coolant circuits 8 and 10 operate at different temperatures wherein the temperature in the cabin heater circuit 8 is typically higher than through the battery heater circuit 10. The temperature differential may be in the order of 50 to 60 degrees Celsius for example. In one particular example, the cabin heater coolant circuit 8 may be at approximately 80 degrees Celsius and the battery coolant circuit 10 may be between 20 and 30 degrees Celsius.

Figure 6:
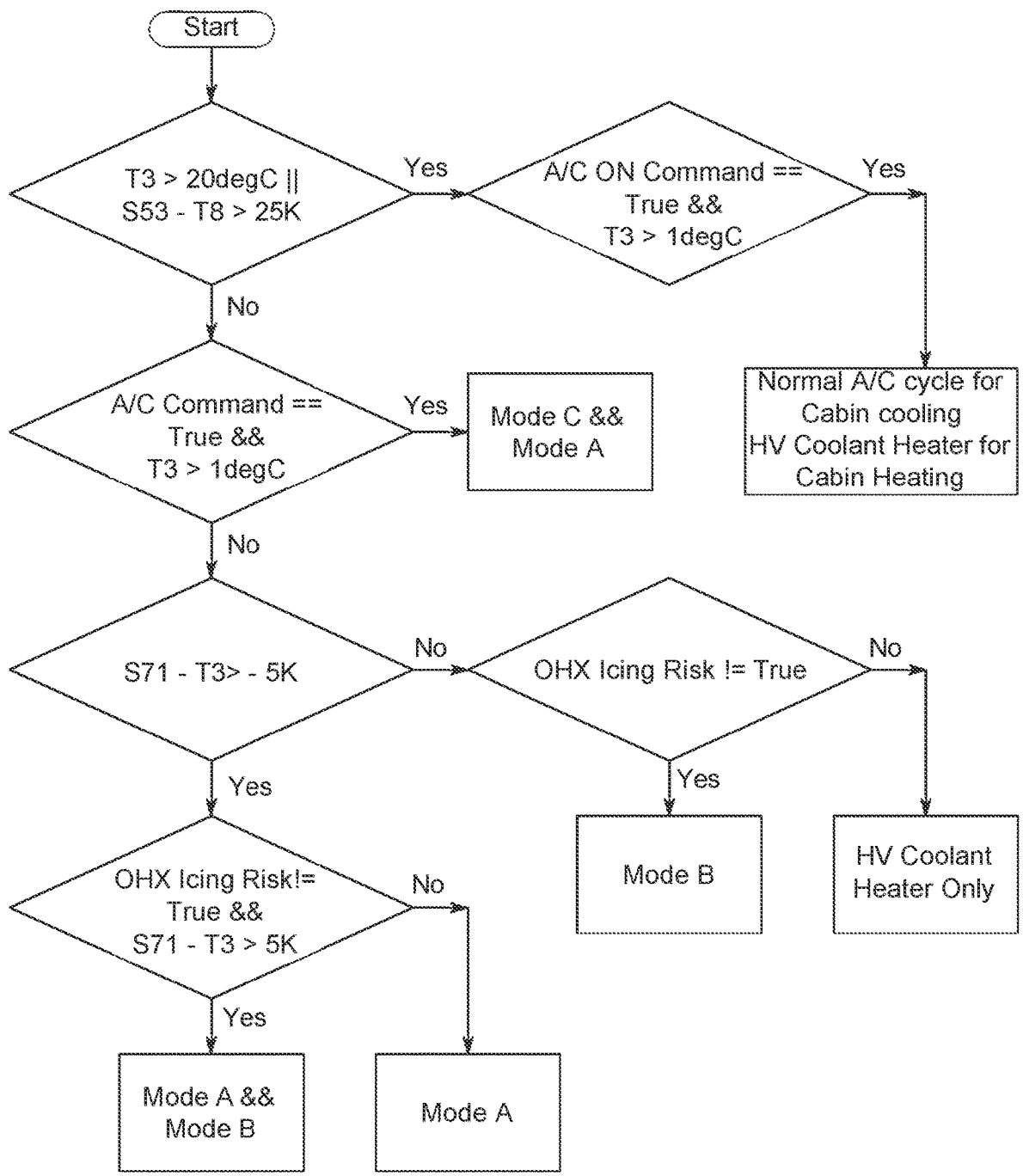
FIG. 6 is a flowchart showing the scheduling of heat transfer from switchable heat sources to a heat sink and mode selection for the electric vehicle heat recovery system according to a control algorithm operable to select the first, second or third modes of operation of the system.
Figure 7:
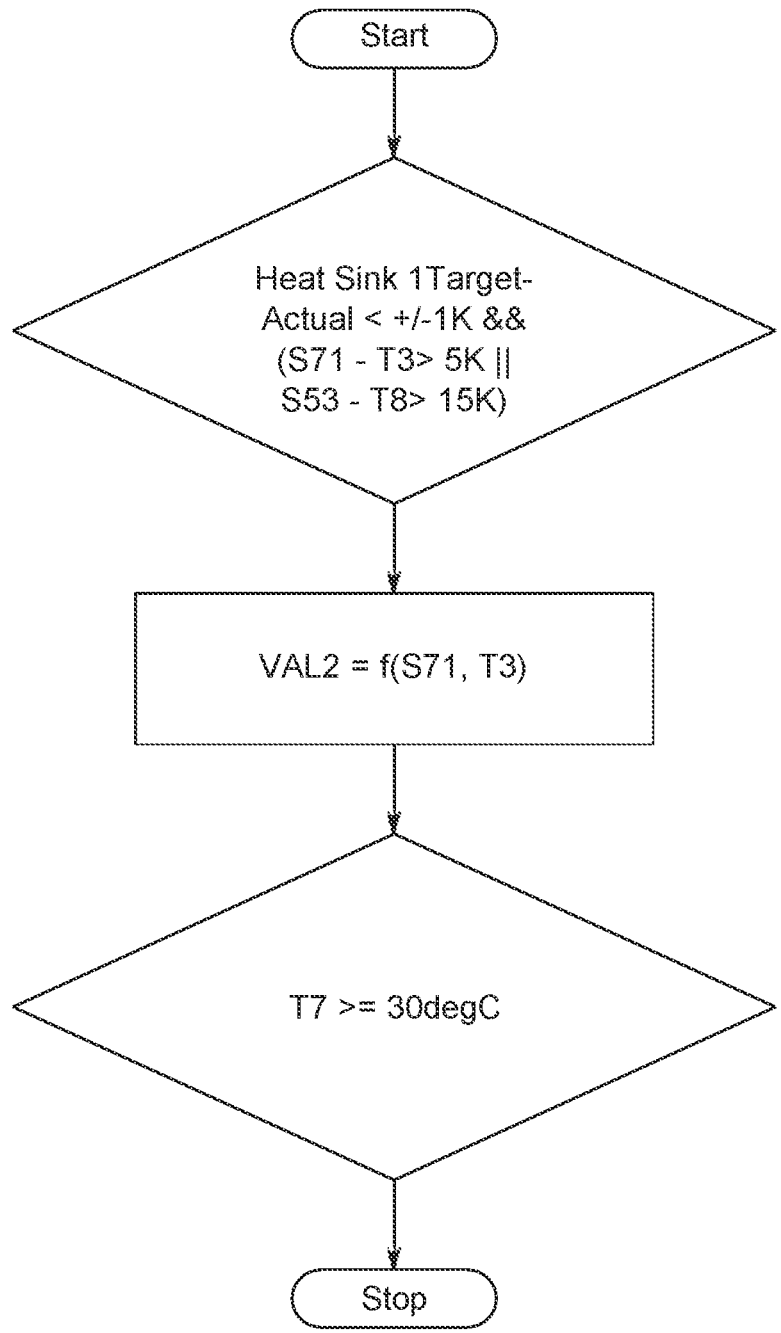
FIG. 7 is a flowchart showing the scheduling of heat transfer from switchable heat sources to a plurality of heat sinks and mode selection for the electric vehicle heat recovery system according to a control algorithm operable to select the fourth mode of operation of the system.

In certain embodiments, the scheduling of heat transfer from different switchable low grade energy sources is done via a control algorithm which is shown in FIGS. 6 and 7 respectively. The control algorithm is the decision making process for the heat recovery system, and the controller operates according to the control algorithm based on varying conditions of vehicle usage and ambient conditions to maximise low grade heat recovery. In turn, low grade heat recovery optimises cabin and powertrain efficiency. An object of the low grade heat recovery is to increase the vehicle range of a battery electric vehicle.

Temperature sensor 39 at the inlet to the compressor 11 in combination with temperature sensor 71 in coolant circuit 2 provide a temperature reading to the controller 20. When a temperature differential between sensor 39 and 71 of at least 5 Kelvin exists, the heat recovery system 1 can enter Mode A or Mode D.

Temperature sensor 39 at the inlet to the compressor 11 in combination with temperature sensor T3 at ambient air capture unit 19 provide a temperature reading to the controller 20. When a temperature differential between sensor 39 and T3 of at least 5 Kelvin exists, the heat recovery system 1 can enter Mode B or Mode C.

In operation, the heat pump condenser 17 becomes inoperative if the temperature sensed at T3 is −15 degrees Celsius or lower. The controller 20 is operable to switch off Mode B and engage either Mode A or Mode D in such a situation because the temperature differential between the input to the compressor at sensor 39 and at the heat source 19 at sensor T3 cannot reach 5 Kelvin because the suction temperature threshold for refrigerant is −20 degrees Celsius.

FIG. 6 and FIG. 7 show the control algorithm programmed into controller 20 for the scheduling of heat transfer from the different heat sources in the system 1 in Modes A, B and C (FIG. 6) and Mode D (FIG. 7). Sensors 33, 39, 53, 43, 71, T3, T7 and T8 in system 1 (FIGS. 1 to 5), are operably linked to controller 20 to provide the temperature and pressure information required to execute the control algorithm shown in FIGS. 6 and 7.

Figure 8:
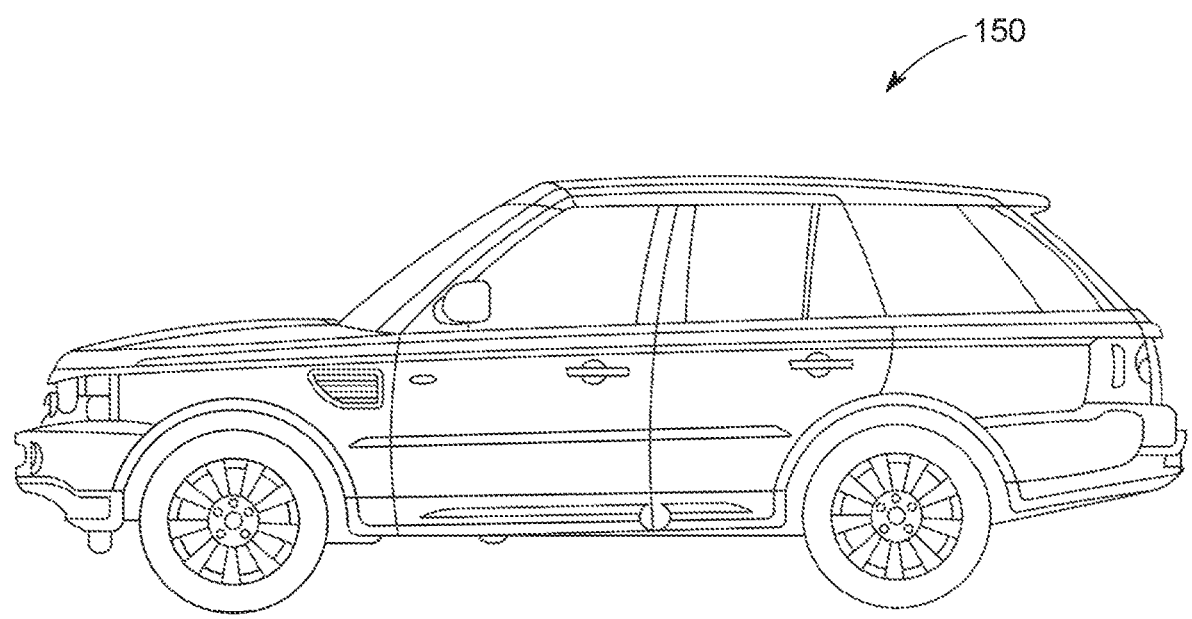
FIG. 8 shows an electric vehicle comprising heat recovery system of the invention.

FIG. 8 shows an electric vehicle 150 in which the heat recovery system 1 of FIG. 1 is located. The central management system (not shown) of the vehicle is electronically connected to the controller 20 of the system 1, the central management system being operably linked to the controller 20.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A heat recovery system for an electric vehicle, comprising first and second switchable heat sources and a controller operable to selectively switch one of the heat sources into thermal communication with a compressor in a thermodynamic cycling system, the thermodynamic cycling system being in thermal communication with a heat sink; and a detection means operable to detect a temperature differential between each of the switchable heat sources and a fluid entering the compressor;
wherein the controller is operable to switch one of the first and second switchable heat sources into thermal communication with the thermodynamic cycling system when a temperature differential is detected between the fluid entering the compressor in the thermodynamic cycling system and the switchable heat source, the compressor being operable to upgrade low grade heat from the switchable heat source to a higher grade heat upon operation of the compressor.

2. The system according to claim 1, wherein the first and second switchable heat sources are each in thermal communication with a fluid within the thermodynamic cycling system and the controller is operable to actuate at least one control valve which is operable to selectively switch the fluid in thermal communication with one of the switchable heat sources into thermal communication with the compressor in the thermodynamic cycling system, wherein the controller is operable to actuate the at least one control valve to switch one of the first and second switchable heat sources into thermal communication with the thermodynamic cycling system when a temperature differential is detected between a fluid entering the compressor in the thermodynamic cycling system and the switchable heat source, the temperature differential being such that the compressor is operable to upgrade low grade heat from the switchable heat source to a higher grade heat upon operation of the compressor.

3. The system according to claim 2, wherein the controller is operably linked to the detection means and is operable to actuate the at least one control valve such that one of the heat sources is switched into thermal communication with the thermodynamic cycling system in response to the detection means detecting the temperature differential between at least one of: the first switchable heat source and the thermodynamic cycling system and the second switchable heat source and the thermodynamic cycling system.

4. The system according to claim 1, wherein the temperature differential is at least 5 Kelvin.

5. The system according to claim 1, wherein the temperature is higher at the first or second switchable heat source than in the fluid entering the compressor.

6. The system according to claim 1, wherein the detection means is configured to monitor a temperature differential between the first switchable heat source and the fluid entering the compressor and between the second switchable heat source and the fluid entering the compressor in sequence.

7. The system according to claim 1, wherein the detection means comprises one or more temperature sensors.

8. The system according to claim 1, wherein the thermodynamic cycling system comprises a first single phase fluid system comprising at least one heat exchanger, a multiphase fluid system in fluid communication with the at least one heat exchanger and comprising the compressor downstream of the heat exchanger and a second single phase fluid system downstream of the compressor and comprising at least one heat exchanger, the first single phase, the multiphase fluid and the second single phase fluid systems being consecutively in thermal communication with one another.

9. The system according to claim 8, wherein the second single phase fluid or coolant system comprises at least one heat exchanger in thermal communication with the heat sink.

10. The system according to claim 8, wherein the second single phase fluid or coolant system comprises at least one valve controllable to switch single phase fluid flow to a heat exchanger in thermal communication with a second heat sink.

11. The system according to claim 10, wherein the second heat sink is a traction battery.

12. The system according to claim 11, wherein the heat exchanger in thermal communication with the second heat sink is in further thermal communication with the first heat sink.

13. The system according to claim 8, wherein the thermodynamic cycling system comprises a coolant system comprising at least one heat exchanger, a refrigerant system in fluid communication with the at least one heat exchanger and comprising the compressor downstream of the heat exchanger and a second coolant system downstream of the compressor and comprising at least one heat exchanger, the coolant and refrigerant systems being consecutively in thermal communication with one another.

14. The system according to claim 1, wherein the thermodynamic cycling system comprises an ambient air capture unit system comprising at least one heat exchanger, a refrigerant system in fluid communication with the at least one heat exchanger and comprising the compressor downstream of the heat exchanger and a coolant system downstream of the compressor and comprising at least one heat exchanger, the coolant and refrigerant systems being consecutively in thermal communication with one another.

15. The system according to claim 14, wherein the ambient air capture unit system comprises at least one heat exchanger being a condenser or wherein the ambient air capture unit system comprises at least one heat exchanger being an evaporator or a dehumidifier.

16. The system according to claim 1, wherein the heat sink is one of a passenger cabin and a traction battery.

17. A vehicle comprising an engine and the heat recovery system according to claim 1, wherein the heat sink is one or more of a passenger cabin and a traction battery.

18. A method of recovering low grade heat energy in an electric vehicle, comprising providing first and second switchable low grade heat sources;
providing a thermodynamic cycling system comprising first and second fluids in thermal communication with each of the first and second switchable low grade heat sources respectively;
detecting a temperature differential between a fluid entering a compressor in the thermodynamic cycling system and the heat available from the first and the second switchable heat source,
switching the first or second fluid in thermal communication with one of the switchable heat sources into thermal communication with a compressor in the thermodynamic cycling system when the temperature differential is such that the compressor is operable to upgrade low grade heat from the switchable heat source to a higher grade heat upon operation of the compressor;
transferring the higher grade heat to a heat sink.

* * * * *